UNITED STATES PATENT OFFICE.

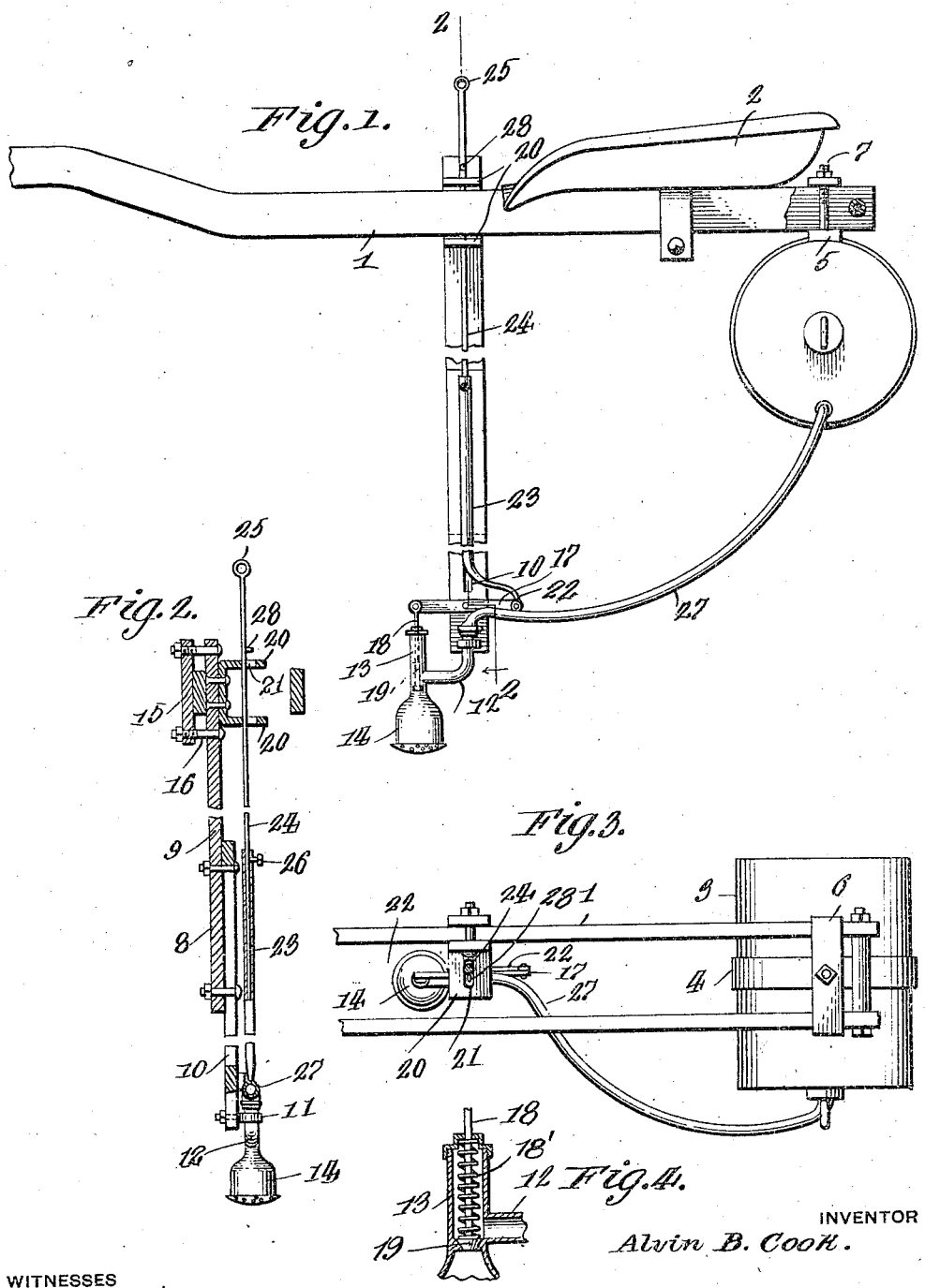

ALVIN B. COOK, OF CASTILE, NEW YORK.

COMPRESSION-SPRAY.

1,258,193.　　　　　　Specification of Letters Patent.　　　Patented Mar. 5, 1918.

Application filed November 17, 1916. Serial No. 131,916.

*To all whom it may concern:*

Be it known that I, ALVIN B. COOK, a citizen of the United States, residing at Castile, in the county of Wyoming and State of New York, have invented certain new and useful Improvements in Compression-Sprays, of which the following is a specification.

This invention relates to compression sprays for cultivators and the primary object of the invention is to provide a spraying device adapted to be attached to a cultivator and provided with an operating rod disposed near the seat of the cultivator so that the occupant of the seat may operate the lever to dispense the contents of the compression tank at the required points on the ground.

As a further object of the invention the device comprises a compression tank carried by the seat support of a riding cultivator and includes a nozzle disposed below the seat and flexibly connected by a hose to the compression tank so that the contents of the tank may be dispensed from the nozzle in close proximity to the ground.

Another object of the invention is the provision of an operating rod connected to a reciprocatory valve for permitting the contents of a compression tank to be dispensed through a nozzle at intervals by raising and lowering the said operating levers.

A further object of this invention is the provision of a compression spray which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a fragmentary elevation of the supporting structure for a cultivator seat showing my invention applied thereto.

Fig. 2 is a section on the line 2—2 of Fig. 1.

Fig. 3 is a fragmentary plan view of the device.

Fig. 4 is a detail section disclosing the interior of a portion of the nozzle.

During the cultivation of young plants, it is often necessary to spray the plants with various kinds of solutions and, when this is done with an ordinary spray connected to a supply tank, considerable waste results and many of the plants are sprayed which do not require spraying. The present invention, therefore, involves a structure that will permit any particular plant to be sprayed without wasting any of the spraying solution.

The usual cultivator frame is provided with rearward extensions which I have designated by the numeral 1 and on which is mounted a seat 2 in which the operator of the cultivator is seated while the cultivator is in motion. The extensions 1 are spaced apart as shown by Fig. 3 of the drawing and their rearward extremities are employed to support a compression tank 3 in which any suitable spraying solution may be carried. A circular supporting band 4 is extended around the central portion of the tank 3 and is fastened to a retaining plate 5 which has its ends engaged with the lower edges of the extensions 1. A clamp plate 6 is mounted upon the top edges of the extensions 1 and has a fastening bolt 7 extended through a central opening and this fastening bolt 7 is connected to the plate 5. A nut is screw threadedly mounted upon the upwardly extending end of the bolt and when the nut is in applied position the clamp plate 6 will tightly contact with the extensions 1 thereby holding the tank 3 in supported position.

A supporting standard 8 is fastened to one of the extensions 1 and comprises a stationary member 9 and a vertically adjustable member 10 which has its lower end provided with a yoke 11 for receiving one end of a branch pipe 12, the opposite end of which is in communication with the restricted end 13 of the nozzle 14. The lower end of the nozzle is constructed to permit the solution, as it is ejected from the nozzle, to be sprayed evenly from the end of the nozzle, and the same may consist of the perforated-end type or needle-valve spraying type of nozzle. The upper end of the fixed member 9 is clamped to one of the bars 1 by a clamp plate 15 which receives the ends of fastening bolts 16 carried by the fixed member 9.

Pivotally mounted at the lower end of the member 10 is a lever 17. Pivotally connected to one end of the lever 17 is a valve stem 18 which is extended into the open end of the small end of the nozzle and which is connected to a reciprocatory valve 19 adapted to open and close the communication between the branch pipe 12 and the nozzle. Fastened to the upper end of the fixed member 9 is a U-shaped bracket having the laterally extending arms 20 each of which is provided with an elongated slot 21. An operating rod 22 has one end connected to the rear end of the lever 17 and is provided with a sleeve 23 adapted to receive an operating extension rod 24 the upper end of which is projected through the slots 21 having its extreme upper terminal provided with a loop 25. The end of the rod is received within the sleeve 23 so that the length of the operating rod may be increased or decreased and the rod 24 is held within the sleeve by a set screw 26 after being adjusted to the proper length. A flexible hose pipe 27 connects the compression tank 3 with the branch pipe 12.

When a downward thrust is exerted on the rod 24 by the operator, the valve stem 18 will cause the valve 19 to be raised above the point of communication between the nozzle and the branch pipe 12 thereby permitting the contents of the tank to pass through the branch pipe and be ejected through the nozzle. The end of the portion 18 of the nozzle is provided with a cap having a recess or depression for receiving one end of a coil spring 18' which circumscribes the rod 18. The opposite end of the spring bears against the valve 19 thereby tending to normally hold the valve in closed position.

For holding the valve in open position, I have provided the rod 24 with a projecting pin 28 which is short enough to permit it to pass through the slots 21 in the bracket. When the pin 28 has been thrust through the uppermost slot 21, the operator may pull the rod to the other end of the slots so that the pin 28 will be in contact with the bottom side of the uppermost flange 20 of the bracket thereby holding the valve in open position.

It will be noted that this construction provided for operating the nozzle has particular advantages inasmuch as the operator who is driving the draft animals may push the operating rod downwardly with his closed hand which grasps the reins.

The close proximity of the operating rod to the driver's seat permits the valve to be easily operated but a slight thrust to one side will cause the operating rod to be locked in open position. For closing the nozzle, it is merely necessary to gently tap the operating rod on one side thereof for causing the pin 28 to move into alinement with the slot in the upper flange 20 of the bracket, whereupon the expansion spring 18' will move both the valve and the operating rod back to inoperative position.

From the foregoing it will be observed that a very simple and durable compression spray has been provided, the details of which embody the preferred form. I desire it to be understood however, that slight changes in the minor details of construction may be made without departing from the spirit of the invention or the scope of the claims hereunto appended.

I claim:

1. A spraying device comprising a supply tank having means for suspending it from a vehicle, a supporting standard provided with means for connecting it to the vehicle, a nozzle carried by the standard and in communication with the said supply tank, the nozzle having an interior valve provided with a coil spring for holding the valve in closed position, an operating rod, and a lever pivotally mounted upon the supporting standard and having one end connected with the said valve and its opposite end connected to the said operating rod, the said rod being disposed in close proximity to the said standard and longitudinally movable with respect thereto and projected above the end of the said standard for permitting actuation of the rod above the upper end of the said standard.

2. A spraying device comprising a supply tank having means for suspending it from a vehicle, a supporting standard provided with means for connecting it to the vehicle, a nozzle carried by the standard and in communication with the said supply tank, the nozzle having an interior valve provided with a coil spring for holding the valve in closed position, an operating rod, and a lever pivotally mounted upon the supporting standard and having one end connected with the said valve and its opposite end connected to the said operating rod, the said standard having a bracket connected thereto and provided with a flange having a slot for receiving the said rod, and a pin connected to the operating rod and adapted to move through the said slot for engaging the lowermost base of the said flange.

In testimony whereof I affix my signature in presence of two witnesses.

ALVIN B. COOK.

Witnesses:
H. A. BEARDSLEY,
CHARLES HAMPTON.